Patented Oct. 19, 1943

2,332,235

UNITED STATES PATENT OFFICE 2,332,235

RESIN AND ABRASIVE BODY

Samuel S. Kistler, West Boylston, Mass., assignor to Norton Company, Worcester, Mass., a corporation of Massachusetts No Drawing. Application October 29, 1941, Serial No. 417,053

10 Claims. (Cl. 51—298)

The invention relates to grinding wheels and other solid abrasive compositions. With regard to its more specific features, the invention relates to grinding wheels or other solid abrasive articles bonded with organic bond, especially the polymerized condensation product of a primary aromatic amine with an aldehyde.

One object of the invention is to improve the qualities of aniline formaldehyde, particularly for use as a bond to make solid abrasive articles. Another object of the invention is to provide an improved dry snagging wheel.

Another object of the invention is to provide a grinding wheel or other solid abrasive article which, in various embodiments, may be substituted for abrasive articles bonded with shellac, rubber or phenol formaldehyde, and which will remove a greater amount of metal for a given wheel wear.

Another object of the invention is to provide a resin which is relatively strong at high temperatures in order, for example, to provide a bond for solid abrasive articles which will withstand heavy duty grinding operations. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

I provide a quantity of aniline. I further provide a quantity of melamine which is believed to have a structure as follows:

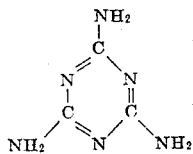

Melamine is thus a triazine with three amino groups. However, I may optionally use diamino triazine which is the same structure with two instead of three amino groups. I further provide a quantity of formaldehyde and condense the mixture of aniline and melamine or diamino triazine therewith, in the presence of a strong acid. Any strong acid can be used, for example, hydriodic, hydrochloric, phosphoric, tri-chlor acetic, di-chlor acetic, maleic, oxalic, picric, and sulphuric acids. The requirement is that the acid should be at least as strong as phosphoric acid to give the best results. For many practical reasons, hydrochloric acid is preferred.

Aniline condensed with formaldehyde in the presence of a strong acid produces a long chain polymer believed to be characterized by the following structure:

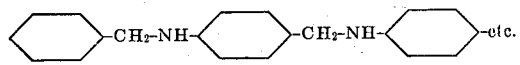

It is believed that melamine condensed with formaldehyde in the presence of a strong acid produces a similar structure where the amino groups are connected with methylene groups. As each molecule of melamine has three amino groups and each molecule of the diamino triazine has two amino groups, the linkage occurs at a plurality of places on each original melamine or diamino triazine molecule if sufficient formaldehyde is used. The mixture produces a complex polymer which is practically impossible to diagram because the benzene rings and the triazine rings may be mixed together haphazardly. With equal molecular proportions of formaldehyde, on the one hand, and aniline plus melamine (or diamino triazine), on the other hand, a plastic moldable resin results. If this plastic moldable resin is mixed with a hardening agent, cross linking will occur in the final cure (under heat), making a strong infusible product.

I provide a quantity of abrasive grain. Any abrasive grain may be used, for example, any of the varieties of alumina, such as emery, corundum, dense "regular" fused alumina, porous white fused alumina; silicon carbide and other hard carbides; quartz; glass; garnet; or diamonds. Two or more of these abrasives may be mixed, if desired.

For the efficient manufacture of an abrasive article such as a grinding wheel, a so-called "plasticizer" is important where the procedure employed is such as to include pre-wetting of the abrasive grains. This so-called plasticizer is a liquid used in such procedure to wet the grains before the powdered resin is added, thus to coat each abrasive granule completely with the powdered resin, forming a so-called "dry granular mix." It is the dry granular mix which is plastic and thus moldable. For this plasticizer to produce the dry granular mix, I prefer to use furfural and/or dichlordiethyl ether. Both of the furfural and the dichlordiethyl ether have the additional function of acting as hardening agents, that is to say, cross linking agents for the mixed polymer described.

Furfural,

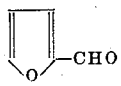

cross links the aniline formaldehyde resin at points on the rings ortho to the amino groups, the cross linking radical being a furyl methylene group. Dichlordiethyl ether, however, cross links the aniline formaldehyde at the amino groups, the cross linking radical being the ether minus the two chlorine atoms which migrate to the amino groups. The dichlordiethyl ether probably reacts preferentially with the aniline resin but if enough of it were used, it could cross link the melamine etc. at the amino groups. Probably the furfural will cross link the melamine etc. resins at the amino groups. At all events the practical point is that either one of these substances, furfural or dichlordiethyl ether, forms not only an excellent plasticizer for the abrasive grains by reason of being a good solvent for the resin but also either one or both acts as a hardening agent cross linking the resin.

It should be understood that the solid abrasive article may include any usual or desired filler such as cryolite, or the mix may have incorporated in it any desired dehydrating agent such as soluble anhydrite, $CaSO_4$, but it should be pointed out that when dichlordiethyl ether is used for hardening, no water is formed in the reaction. The solid abrasive body may also have incorporated therein more or less of a halogen-containing compound, either polymeric or monomeric, containing chlorine, bromine or iodine. Useful examples are polyvinyl chloride, polyvinylidene dichloride, rubber hydrochloride, chlorinated rubber, chlorinated polyisobutylene; any chlorine, bromine or iodine substituted paraffine hydrocarbon, such as hexa chlor ethane, tetra chlor pentane, 1,2, diiodo ethane, beta butylene bromide, partly chlorinated eicosane, or any aliphatic halohydrin of not more than six carbon atoms, such as any of the amylene chlorhydrins; propylene chlorhydrin; any of the butylene chlorhydrins; ethylene chlorhydrin, ethylene bromohydrin, and glycerol alpha gamma dichlorhydrin. Naturally enough, most of the examples are chlorinated compounds because these are cheaper and more readily available than the brominated or iodated compounds, but the latter two give effective results. The fluorinated compounds are rejected because they are too stable and will not alkylate the polymer.

As just indicated, the purpose of adding these halogenated compounds is to provide halogen halide, either hydrogen chloride, hydrogen bromide, or hydrogen iodide, at the grinding line during a grinding operation. The heat of grinding which may be, for example, of the order of 500° C. dissociates the resin and thereby releases the acid. However, it is released only at the grinding line and, therefore, is not spread over the work piece or sprayed upon the operator or on the machine generally. The acid is in the form of a gas and appears to improve the efficiency of the grinding action. It is believed that it makes the chips more brittle and prevents sticking of the chips to the grinding wheel, that is to say, it eliminates or reduces the loading.

I use from 1 to 10% of melamine in the mixture of melamine with aniline or from 1 to 10% of diamino triazine in the mixture thereof with aniline. I have found that such mixtures give, after the final hardening, a stronger resin than hardened aniline formaldehyde. For heavy duty snagging operations, it is desirable that the abrasive grains be held relatively firmly in place and a strong resin bond is desirable.

As illustrative of the invention, I will give a few examples. No attempt will be made to permute the examples to give one for each of the various halogenated compounds mentioned. In each example, polyvinylidene dichloride will be used as a typical halogenated compound and it must be understood that the same quantity by weight of any of the other mentioned halogenated compounds could be substituted. The foregoing is not intended to indicate that an equivalent amount of hydrchloric acid or other acid would be obtained by an equal weight of the other substances since such would not be the case; rather a little bit more or a little bit less of the halogenated compound can be used in any event.

EXAMPLES FOR THE MANUFACTURE OF THE FUSIBLE PLASTIC RESIN

*Example I*

Eight hundred and fifteen cubic centimeters of aniline plus forty-two and eight tenths grams of melamine (5% by weight of the entire mixture of aniline and melamine) are dissolved in eight liters of water containing nine and three tenths mols of hydrochloric acid. Seven hundred and fifty cubic centimeters of formalin solution containing four tenths gram of formaldehyde to the cubic centimeter is added. The mixture is stirred. After one hour, a quantity of sodium hydroxide equivalent to the hydrochloric acid present is added. The precipitated resin is filtered, washed, dried, and ground to a fine powder.

*Example II*

I proceed as in Example I using, however, seven hundred and seventy-two cubic centimeters of aniline and eighty-five and eight tenths grams of melamine which is ten per cent by weight of the mixture of aniline and melamine.

*Example III*

I proceed exactly as in Examples I and II, only instead of the melamine I use diamino triazine. Specifically, seven hundred and ninety-three cubic centimeters of aniline is mixed with sixty-four and two tenths grams of diamino triazine, this amount of the latter being seven and one-half per cent by weight of the mixture.

EXAMPLES OF MAKING GRINDING WHEELS

*Example IV*

Two hundred and ten grams of #80 grit size fused alumina is stirred with four and five tenths cubic centimeters of furfural. Twelve and eight tenths grams of soluble anhydrite ($CaSO_4$) and forty-two and eight tenths grams of the resin from any one of Examples I, II and III are added. The whole is mixed. The free flowing granular mix is molded in a hot press under a pressure of three tons to the square inch at 175° C. for one and one-half hours. The wheel is then taken from the mold and trued, if desired.

*Example V*

Two hundred and ten grams of #80 grit size fused alumina is stirred with four and five tenths cubic centimeters of dichlordiethyl ether. Four and four tenths grams of soluble anhydrite ($CaSO_4$) and forty-two and eight tenths grams of the resin from any one of Examples I, II or III and four and two tenths grams of polyvinylidene dichloride are added. The whole is mixed. The dry granular mix is molded in a hot press under a pressure of three tons to the square inch at a temperature of 175° C. for one and one-half hours.

The soluble anhydrite is useful for taking up water which is in the resin by absorption from the atmosphere. Almost any moldable resin will pick up a little water from the atmosphere. It should be understood, however, that for many purposes the dehydrating agent may be omitted because the amount of water picked up by this type of resin is rather small and even this can be reduced by drying and proper precautions.

Example VI

Grinding wheels are made using aniline-melamine-formaldehyde resin with respectively 1, 2, 3, 5, 6, and 7 per cent of melamine by weight, as follows: Four hundred and six grams of fused alumina #80 grit size is mixed with eleven and ninety-two hundredths grams of furfural and five and twenty-one hundredths grams of "Reogen," a dust preventing compound. Fifteen and fifty-nine hundredths grams of cryolite, seventy-four and five tenths grams of soluble anhydrite, and forty-eight and eight tenths grams of the resin are added. By mixing, a dry granular mix is formed which is then spread in a mold and cured at 175° C. in a hot press for one hour under a pressure of three ton to the square inch. The following table gives the tensile strength of abrasive mixtures according to this example at the different temperatures shown, with the varying amount of melamine shown.

| Percentage of melamine | Temperature | | |
|---|---|---|---|
| | 100° C. | 130° C. | 160° C. |
| 7 | 994 | 1,520 | 1,331 |
| 6 | 1,191 | 1,138 | 1,591 |
| 5 | 1,627 | 943 | 1,541 |
| 4 | | | |
| 3 | 1,188 | 1,351 | 1,371 |
| 2 | 1,200 | 1,321 | 1,194 |
| 1 | 1,214 | 1,146 | 1,168 |
| 0 | 1,287 | 982 | 471 |

Figures give tensile strength in pounds per square inch.

It is important that the bond for the abrasive grains in a grinding wheel have strength at certain elevated temperatures. The resin of this invention has such characteristics, as will be seen from the foregoing table. In the table the line for 4% of melamine is left blank because the test pieces were accidentally broken before the test could be made. No significance, therefore, need be attached to this omission, especially since the range of figures shows the general trend. If these figures were graphed, they would not give a smooth curve but such should not be expected on this kind of test. The significant result is that in general at 160° C., 5% and 6% of melamine gives superior results to straight aniline formaldehyde resin while for other temperatures the product is at least no worse when melamine is added. As a rough empirical rule, the preferred proportion of melamine may be taken as 5%.

I make no claim herein to the resin, that subject matter being claimed in my application Serial No. 459,295, filed September 22, 1942, as a division of the present application.

It will thus be seen that there has been provided by this invention, an article, a composition and a method in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

1. A rigid abrasive body comprising abrasive grains bonded with resin bond at least 50% of which is formed by condensing in the presence of a strong acid (at least as strong as phosphoric acid) a mixture of aniline and triazine selected from the group consisting of melamine and diamino triazine, and more than one molecular proportion of formaldehyde.

2. A rigid abrasive body comprising abrasive grains bonded with resin bond at least 50% of which is formed by condensing in the presence of a strong acid (at least as strong as phosphoric acid) a mixture of from 90% to 99% aniline and from 10% to 1% of triazine selected from the group consisting of melamine and diamino triazine, and more than one molecular proportion of formaldehyde.

3. A rigid abrasive body comprising abrasive grains bonded with resin bond at least 50% of which is formed by condensing in the presence of a strong acid (at least as strong as phosphoric acid) a mixture of aniline and melamine, and more than one molecular proportion of formaldehyde.

4. A solid abrasive body comprising abrasive grains bonded with resin bond at least 50% of which is formed by condensing in the presence of a strong acid (at least as strong as phosphoric acid) a mixture of from 90% to 99% aniline and from 10% to 1% of melamine, and more than one molecular proportion of formaldehyde.

5. A rigid abrasive body according to claim 1 in which the resin is cross-linked with a solvent therefor selected from the group consisting of furfural and dichlordiethyl ether.

6. A rigid abrasive body according to claim 2 in which the resin is cross-linked with a solvent therefor selected from the group consisting of furfural and dichlordiethyl ether.

7. A rigid abrasive body according to claim 3 in which the resin is cross-linked with a solvent therefor selected from the group consisting of furfural and dichlordiethyl ether.

8. A rigid abrasive body according to claim 4 in which the resin is cross-linked with a solvent therefor selected from the group consisting of furfural and dichlordiethyl ether.

9. An abrasive article comprising abrasive grains bonded together by a bond that comprises the hardened resinous reaction product under heat of a mix that comprises (a) the condensates in the presence of a strong acid (at least as strong as phosphoric acid) of formaldehyde and aniline and triazine selected from the group consisting of melamine and diamino triazine and (b) a hardening agent cross-linked with the respective condensates, the abrasive grains being distributed within the said hardened resinous reaction product and by the latter held bonded together.

10. An abrasive body comprising abrasive grains bonded with a resin bond comprising the hardened resinous reaction product of resin formed by condensing in the presence of a strong acid (at least as strong as phosphoric acid) formaldehyde and a mixture of aniline and triazine selected from the group consisting of melamine and diamino triazine.

SAMUEL S. KISTLER.